United States Patent

Tanaka et al.

Patent Number: 5,298,336
Date of Patent: Mar. 29, 1994

[54] MULTILAYER COMPOSITE SLIDING MATERIAL HAVING EXCELLENT SEIZURE RESISTANCE PROPERTY

[75] Inventors: Tadashi Tanaka, Konan; Masaaki Sakamoto, Nagoya; Koichi Yamamoto, Komaki; Tsukimitsu Higuchi, Gifu, all of Japan

[73] Assignee: Daido Metal Company, Ltd., Nagoya, Japan

[21] Appl. No.: 18,719

[22] Filed: Feb. 17, 1993

[30] Foreign Application Priority Data

Feb. 18, 1992 [JP] Japan .................................. 4-030495

[51] Int. Cl.⁵ .............................. B22F 3/16; B22F 3/18
[52] U.S. Cl. ........................................ 428/552; 428/546; 428/548; 428/551; 428/553; 428/554; 428/555; 428/556; 428/562; 428/569; 75/231; 75/244; 75/246; 419/28; 419/64; 419/69
[58] Field of Search ............... 428/546, 548, 551, 552, 428/553, 554, 555, 556, 562, 569

[56] References Cited

U.S. PATENT DOCUMENTS

| | | | |
|---|---|---|---|
| 3,644,105 | 2/1972 | Selker et al. | 29/196.3 |
| 4,206,268 | 6/1980 | Roemer et al. | 428/643 |
| 4,406,857 | 9/1983 | Mahrus et al. | 420/474 |
| 4,505,987 | 3/1985 | Yamada et al. | 428/553 |
| 4,579,712 | 4/1986 | Mori | 419/9 |
| 5,041,339 | 8/1991 | Mori et al. | 428/557 |
| 5,116,144 | 5/1992 | Kamiya et al. | 384/291 |
| 5,185,216 | 2/1993 | Tanaka et al. | 428/614 |
| 5,217,814 | 6/1993 | Kawakami et al. | 428/545 |
| 5,242,717 | 9/1993 | Tanaka et al. | 427/455 |

FOREIGN PATENT DOCUMENTS 2223506 4/1990 United Kingdom .

Primary Examiner—Donald P. Walsh
Assistant Examiner—John N. Greaves
Attorney, Agent, or Firm—Browdy and Neimark

[57] ABSTRACT

The present invention provides a multilayer composite sliding material with excellent seizure resistance property having a steel plate or a steel plate having surfaces plated with copper or the like; a bond layer having a thickness of 0.05 to 0.5 mm, formed on the steel plate, and made of a sintered powder material consisting of 5 to 16% Sn, 0 to 15% Pb, 0 to 0.5% P and balance essentially Cu; and an alloy layer having a thickness of 0.1 to 1.0 mm, formed on the bond layer, and made of a sintered powder material consisting of 5 to 16% Sn, 1 to 12% $MoS_2$ and balance essentially Cu. In a modified form of the alloy layer, not more than 20% Pb, not more than 1% P or not more than 12% Ni may be added. $MoS_2$ powder may be coated with Cu or Ni.

15 Claims, 1 Drawing Sheet

MULTILAYER COMPOSITE SLIDING MATERIAL HAVING EXCELLENT SEIZURE RESISTANCE PROPERTY

BACKGROUND OF THE INVENTION

1. Field of the Invention

The present invention relates to a composite sliding material suitably applicable to a bush, a washer and the like in an automobile, an industrial machine, an agricultural machine and the like, and particularly to a composite sliding material having excellent seizure resistance property in a boundary lubrication state under severe lubrication conditions, as compared with conventional materials.

2. Description of the Related Art

A sintered copper alloy such as bronze, lead bronze, graphite-containing bronze or the like is mainly used for the bush, the washer or the like. Such an alloy exhibits the sliding ability in its own way under the conditions of use in which lubricant oil is present.

However, the alloy is particularly inferior in its seizure resistance property and thus does not exhibits a satisfactory sliding ability in a boundary lubrication region.

Although the bronze, lead bronze or graphite-containing bronze is generally widely used as a material having excellent seizure resistance property, there is a demand for a sliding material having more excellent seizure resistance property than that of a conventional material with a recent increase in the performance of an internal combustion engine.

SUMMARY OF THE INVENTION

The present invention has been designed under the above technical background, and a primary object of the present invention is to provide a sliding material in which the seizure resistance property under boundary lubrication conditions is improved.

In order to achieve the object, the present invention provides a multilayer composite sliding material with excellent seizure resistance property comprising a steel plate or a steel plate having surfaces plated with copper; a bond layer having a thickness of 0.05 to 0.5 mm, which is formed on the steel plate and made of a sintered powder material consisting of, by weight, 5 to 16% of tin, 0 to 15% of lead, 0 to 0.5% of phosphorus and balance essentially copper; and an alloy having a thickness of 0.1 to 1.0 mm, which is formed on the surface of the bond layer and made of a sintered powder material consisting of, by weight, 5 to 16% of tin, 1 to 12% of $MoS_2$ and balance essentially copper.

In a preferred form of the multilayer composite sliding material, the alloy layer may contain $MoS_2$ powder each particle of which is coated with copper or nickel.

In another preferred form of the multilayer composite sliding material, the alloy layer may contain not more than 20% of lead.

In a further preferred form of the multilayer composite sliding material, the alloy layer may contain not more than 1% of phosphorus.

In a still further preferred form of the multilayer composite sliding material, the alloy layer may contain 12% by weight or less of nickel.

A description will now be made of the reasons for limiting the composition of the sliding material and the function thereof.

(1) Tin: 5 to 16% by weight

Tin is alloyed with copper to increase the strength of the matrix. With less than 5%, the material has insufficient strength and poor wear resistance. With over 16% by weight, the alloy becomes brittle.

(2) $MoS_2$: 1 to 12% by weight $MoS_2$ functions as a component having the self lubricating ability in a state of metal contact wherein no lubricant oil film is formed. With less than 1%, the lubricating function is insufficient. With over 12%, the alloy strength significantly deteriorate.

(3) Lead: not more than 20% by weight

Lead functions as a soft component and has an effect on the lubricating ability, and when lubricant oil is present, lead functions as a component having good affinity for oil and has an effect on the lubricating ability. With over 20%, since the alloy strength deteriorates, the material is unsuitable as a sliding material.

(4) Phosphorus: not more than 1% by weight

Not more than 1% of phosphorus is added in order to improve the wear resistance and sintering property of the material. With over 1%, the toughness among the mechanical properties deteriorates.

(5) Nickel: not more than 12%

Nickel is contained in the alloy as a coating material for particles of the $MoS_2$ powder below, and can be added in an amount of 12% in accordance with the amount of $MoS_2$ added. It also dissolves in copper matrix and improves mechanical properties of the alloy.

The $MoS_2$ powder each paraticle of which is coated with copper or nickel is used in order to increase bonding strength of the sintered substance itself and causing $MoS_2$ particles to be uniformly dispersed in matrix of the sintered alloy layer.

(6) Bond layer

The bond layer improves bonding strength between the steel plate and the alloy layer. The bond layer preferably consists of 5 to 16% of tin, 0 to 15% of lead, 0 to 0.5% of phosphorus and balance essentially copper in order to provide the bond layer with higher strength than that of the alloy layer.

Although the thickness of the bond layer is preferably as small as possible, it is preferably 0.05 to 0.5 mm in light of a way of powder putting on the steel backing plate.

DETAILED DESCRIPTION OF THE INVENTION

Figure 1:
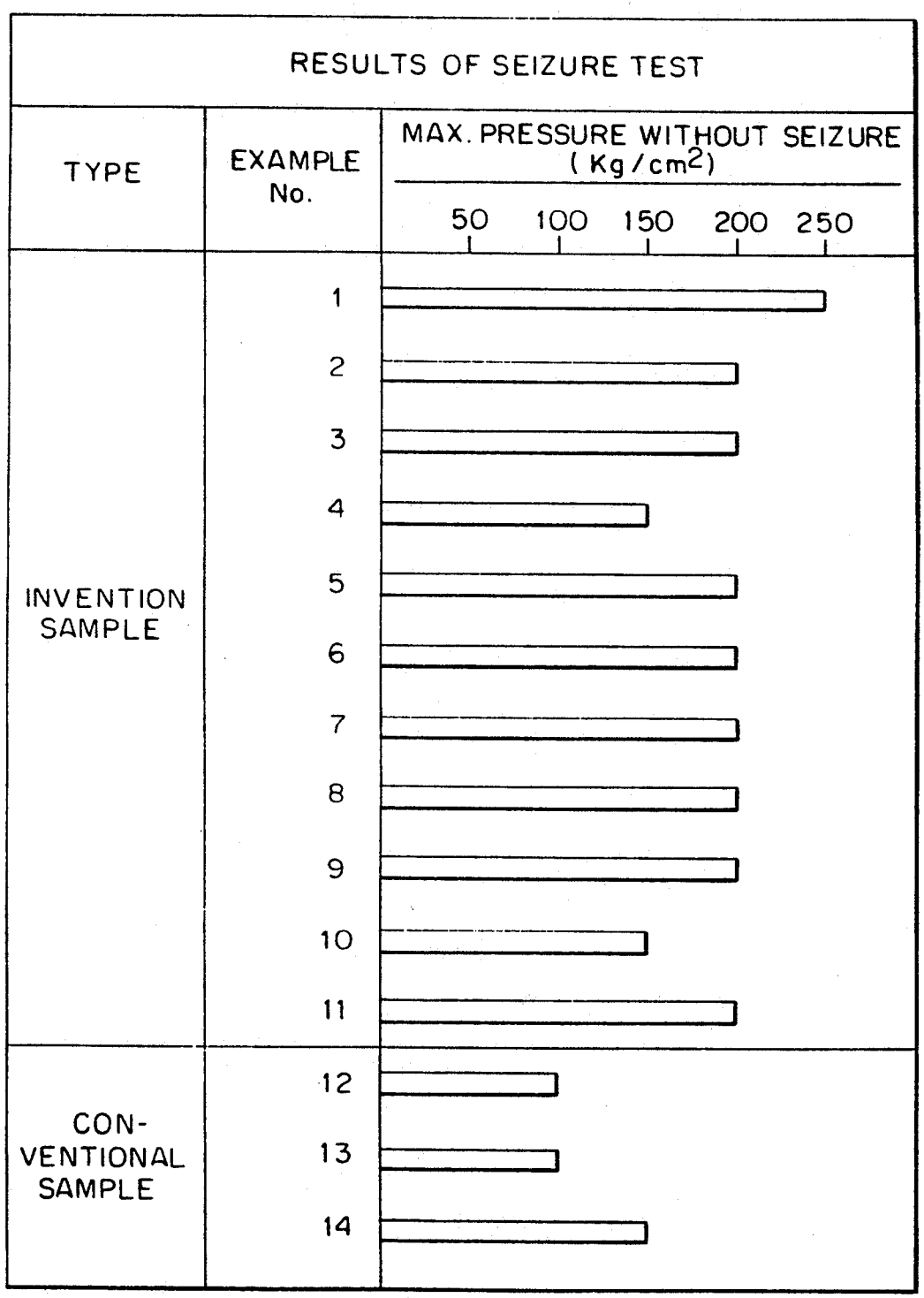
FIG. 1 is a graph showing results of a comparison seizure-test of the invention materials and conventional materials.

Experiment (1) A copper alloy powder having a grain size of 100 μm and consisting of 11% of tin, 4% of lead, 0.3% of phosphorus and balance essentially copper was uniformly put on a steel plate (JIS SPCC) having a thickness of 1.00 mm, a width 120 mm and a copper plated layer of about 10 μm thick on the surface thereof. The alloy powder was then sintered by heating in an atmosphere of hydrogen in a furnace at 700° to 900° C. for 10 to 30 minutes to provide a bond layer.

Each of alloy powders shown in Table 1 was further uniformly put on the bond layer and was then sintered by heating in an atmosphere of hydrogen in a furnace at 700° to 900° C. for 10 to 30 minutes to obtain a composite material. The composite material was then rolled and subjected to re-sintering treatment by holding in an atmosphere of hydrogen at 700° to 900° C. for 10 to 30 minutes to obtain a material of the present invention (Samples No. 2 and 4). The bond layer had a thickness of 0.2 mm, and the alloy layer had a thickness of 0.5 mm. The mechanical properties of the composite sliding materials obtained are shown in Table 2, results of seizure tests are shown in FIG. 1, and test conditions are shown in Table 3.

(2) Sliding materials (Samples No. 1, 3 and 5 to 10) were obtained by the same method as that employed in above Experiment item 1 with the exception that $MoS_2$ powder, each particle of which was previously coated with copper by a conventional electroplating method and is shown in Table 1, was used. Similarly, $MoS_2$ powder each particle of which was previously coated with nickel was used to obtain a material of the present invention (Sample No. 11).

Mechanical properties of the materials obtained are shown in Table 2, results of the seizure test is shown in FIG. 1, and the test conditions are shown in Table 3.

(3) Comparative materials were formed by the following method:

Each of the alloy powders (grain size; 150 μm) shown in Table 1 was uniformly put on a steel plate (JIS SPCC) having a copper plated layer of about 10 μm thick on the surface thereof, a thickness of 1.2 mm and a width of 120 mm. The alloy powder was then sintered by heating in an atmosphere of hydrogen in a furnace at 700° to 900° C. for 10 to 30 minutes to obtain a composite material. The thus-obtained composite material was then rolled and subjected to re-sintering treatment under the same conditions as those of the above sintering to obtain conventional materials (Samples No. 12 to 14). The alloy layer had a thickness of 0.5 mm. Mechanical properties of the materials are shown in Table 2, results of the seizure test are shown in FIG. 1, and the test conditions are shown in Table 3.

Evaluation of Test Results

Sample No. 12 of a conventional material and Sample No. 9 of this invention material, both of which had a similar composition, were compared by the seizure test. The results of the test shown in FIG. 1 reveal that Sample No. 9 containing 8% of $MoS_2$ exhibits a maximum surface pressure without higher by 100 $Kgf/cm^2$ than that of Sample No. 12 and thus has excellent seizure resistance property. Comarison between conventional Sample No. 13 and invention Sample No. 10 reveals that the addition of 2% of $MoS_2$ increases the maximum surface pressure seizure of invention Sample No. 10 by 50 $Kgf/cm^2$ and improves the seizure resistance property.

As will be apparent from the above, the addition of $MoS_2$ to the copper alloy in the copper alloy layer of the multilayer composite sliding material of the present invention improves the seizure resistance property, as compared with conventional sintered alloys such as bronze, lead bronze, graphite-containing bronze and the like.

TABLE 1

| Type | Example No. | Cu | Sn | Pb | Ni | $MoS_2$ | Cr | P | Note |
|---|---|---|---|---|---|---|---|---|---|
| A | 1 | balance | 10 | — | — | 4 | — | — | $MoS_2$ with Cu coating |
|   | 2 | " | 10 | — | — | 4 | — | — | $MoS_2$ without Cu coating |
|   | 3 | " | 9 | — | — | 8 | — | — | $MoS_2$ with Cu coating |
|   | 4 | " | 9 | — | — | 8 | — | — | $MoS_2$ without Cu coating |
|   | 5 | " | 9 | — | — | 12 | — | — | $MoS_2$ with Cu coating |
|   | 6 | " | 10 | — | — | 6 | — | 0.2 | $MoS_2$ with Cu coating |
|   | 7 | " | 10 | — | — | 12 | — | 0.2 | $MoS_2$ with Cu coating |
|   | 8 | " | 9 | 4 | — | 8 | — | 0.2 | $MoS_2$ with Cu coating |
|   | 9 | " | 10 | 10 | — | 8 | — | 0.05 | $MoS_2$ with Cu coating |
|   | 10 | " | 5 | 20 | — | 2 | — | 0.02 | $MoS_2$ with Cu coating |
|   | 11 | " | 5 | 20 | 5 | 5 | — | — | $MoS_2$ with Ni coating |
| B | 12 | " | 10 | 10 | — | — | — | 0.05 | no bond layer |
|   | 13 | " | 3 | 23 | — | — | — | 0.02 | no bond layer |
|   | 14 | " | 10 | — | — | — | 4 | — | no bond layer |

A: Invention Sample
B: Conventional Sample

TABLE 2

| | | Mechanical Properties | | |
|---|---|---|---|---|
| Type | Example No. | Hardness of alloy layer (Hv5) | Tensile strength (N/mm²) | Bonding strength between bond layer and alloy layer (N/mm²) |
| A | 1 | 90 | 200 | 165 |
|   | 2 | 80 | 180 | 120 |
|   | 3 | 85 | 140 | 107 |
|   | 4 | 75 | 120 | 72 |
|   | 5 | 77 | 92 | 50 |
|   | 6 | 82 | 191 | 125 |
|   | 7 | 80 | 122 | 83 |
|   | 8 | 78 | 78 | 59 |
|   | 9 | 75 | 78 | 59 |

TABLE 2-continued

| Type | Example No. | Mechanical Properties | | |
|---|---|---|---|---|
| | | Hardness of alloy layer (Hv5) | Tensile strength (N/mm$^2$) | Bonding strength between bond layer and alloy layer (N/mm$^2$) |
| B | 10 | 50 | 98 | 69 |
| | 11 | 50 | 88 | 62 |
| | 12 | 73 | 235 | 176 |
| | 13 | 48 | 137 | 108 |
| | 14 | 57 | 108 | 88 |

A: Invention Sample
B: Conventional Sample

Note: Since Samples No. 12 to 14 had no bond layer, the bonding strength is shown by a numerical value of bonding strength between the copper-plated steel plate and the alloy layer.

TABLE 3

| Item | Conditions |
|---|---|
| Bearing Size | Internal diameter 20 × width 20 × thickness 1.5 mm |
| Revolution of Shaft | 1000 rpm |
| Peripheral Velocity of Shaft | 2.0 m/sec |
| Clearance | 0.025–0.070 mm |
| Lubricant oil | SAE #10 |
| Oil Feed Rate | 2 ml/min |
| Shaft Material | JIS S55C |
| Shaft Surface Roughness | 1.0 μm Rmax |
| Shaft Hardness | 670 Hv 10 |
| Evaluation Way | |
| When the back surface of the sample bearing is heated to 100° C. of temperature by friction, the state is considered as seizure, and comparison is made on the basis of load at seizure. | |

We claim:

1. A multilayer composite sliding material with excellent seizure resistance property comprising a steel plate or a steel plate having a surface plated with copper; a bond layer having a thickness of 0.05 to 0.5 mm, formed on said steel plate, and make of a sintered powder material consisting of, by weight, 5 to 16% of tin, 0 to 15% of lead, 0 to 0.5% of phosphorus and balance essentially copper; and an alloy layer having a thickness of 0.1 to 1.0 mm, formed on said bond layer, and made of a sintered powder material consisting of, by weight, 5 to 16% of tin, 1 to 12% of MoS$_2$, and balance essentially copper.

2. A multilayer composite sliding material according to claim 1, wherein each particle of the MoS$_2$ powder in said alloy layer is coated with copper or nickel.

3. A multilayer composite sliding material according to claim 1, wherein said alloy layer contains an amount of lead not more than 20%.

4. A multilayer composite sliding material according to claim 1, wherein said alloy layer contains an amount of phosphorus not more than 1%.

5. A multilayer composite sliding material according to claim 1, wherein said alloy layer contains an amount of nickel not more than 12%.

6. A multilayer composite sliding material according to claim 2, wherein said alloy layer contains an amount of lead not more than 20%.

7. A multilayer composite sliding material according to claim 6, wherein said alloy layer contains an amount of phosphorus not more than 1%.

8. A multilayer composite sliding material according to claim 3, wherein said alloy layer contains an amount of phosphorus not more than 1%.

9. A multilayer composite sliding material according to claim 2, wherein said alloy layer contains an amount of phosphorus not more than 1%.

10. A multilayer composite sliding material according to claim 9, wherein said alloy layer contains an amount of nickel not more than 12%.

11. A multilayer composite sliding material according to claim 8, wherein said alloy layer contains an amount of nickel not more than 12%.

12. A multilayer composite sliding material according to claim 7, wherein said alloy layer contains an amount of nickel not more than 12%.

13. A multilayer composite sliding material according to claim 6, wherein said alloy layer contains an amount of nickel not more than 12%.

14. A multilayer composite sliding material according to claim 4, wherein said alloy layer contains an amount of nickel not more than 12%.

15. A multilayer composite sliding material according to claim 3, wherein said alloy layer contains an amount of nickel not more than 12%.

* * * * *